(12) United States Patent　　　(10) Patent No.:　US 12,678,901 B2

Suzuki　　　　　　　　　　　　　　　(45) Date of Patent:　　　Jul. 14, 2026

(54) WORKPIECE HOLDING DEVICE AND WORKPIECE CONVEYANCE DEVICE

(71) Applicant: DMG MORI CO., LTD., Nara (JP)

(72) Inventor: Syoji Suzuki, Nara (JP)

(73) Assignee: DMG MORI CO., LTD., Nara (JP)

( * ) Notice: Subject to any disclaimer, the term of this patent is extended or adjusted under 35 U.S.C. 154(b) by 219 days.

(21) Appl. No.: 18/275,009

(22) PCT Filed: Sep. 10, 2021

(86) PCT No.: PCT/JP2021/033296
§ 371 (c)(1),
(2) Date: Jul. 30, 2023

(87) PCT Pub. No.: WO2022/163000
PCT Pub. Date: Aug. 4, 2022

(65) Prior Publication Data

US 2023/0415284 A1　　Dec. 28, 2023

(30) Foreign Application Priority Data

Feb. 1, 2021　(JP) ................................. 2021-014408

(51) Int. Cl.
B23Q 3/00　　(2006.01)
B23Q 3/06　　(2006.01)
B23Q 7/04　　(2006.01)
(52) U.S. Cl.
CPC .................................... B23Q 3/06 (2013.01);
B23Q 7/04 (2013.01)

(58) Field of Classification Search
CPC .............. B23Q 3/00; B23Q 3/06; B23Q 7/04
See application file for complete search history.

(56) References Cited

U.S. PATENT DOCUMENTS 6,357,735 B2 * 3/2002 Haverinen ......... B23K 37/0536
269/49
8,671,533 B2 * 3/2014 Haag ................. B23B 31/16254
269/20

(Continued)

FOREIGN PATENT DOCUMENTS

CN　　208303924 U　　1/2019
CN　　109465750 A　　3/2019

(Continued)

*Primary Examiner* — Lee D Wilson

(74) *Attorney, Agent, or Firm* — IP Business Solutions, LLC.

(57)　　　　　　　ABSTRACT

Disclosed herein is a workpiece holding device including: a plurality of first claw portions capable of linearly moving in a direction parallel to a predetermined plane; a second claw portion and a third claw portion disposed to face each other in a direction orthogonal to the predetermined plane; and a motion conversion mechanism portion that converts a linear motion associated with movement of the first claw portion into a linear motion in the direction orthogonal to the predetermined plane, transmits the linear motion to the second claw portion. The first claw portion, the second claw portion, and the third claw portion each have a grasping surface to abut against a workpiece to be held, and the grasping surface of the first claw portion is different in shape from the grasping surfaces of the second claw portion and the third claw portion.

12 Claims, 11 Drawing Sheets

(56)            References Cited

U.S. PATENT DOCUMENTS

| | | | |
|---|---|---|---|
| 2007/0271753 A1* | 11/2007 | Haag ................. | B23B 31/16254 |
| | | | 29/235 |
| 2018/0229348 A1* | 8/2018 | Womack ................. | B25B 13/18 |
| 2021/0245314 A1* | 8/2021 | Pulsifer ................... | B23Q 1/26 |

FOREIGN PATENT DOCUMENTS

| | | |
|---|---|---|
| CN | 209986249 U | 1/2020 |
| JP | 2008-307650 A | 12/2008 |

\* cited by examiner

WORKPIECE HOLDING DEVICE AND WORKPIECE CONVEYANCE DEVICE

TECHNICAL FIELD

The present invention relates to a workpiece holding device and a workpiece conveyance device.

BACKGROUND ART

For example, Japanese Patent Laying-Open No. 2008-307650 (PTL 1) discloses a workpiece supply and carrying-out device comprising: a plurality of pairs of workpiece hands that can grasp a workpiece; and a workpiece hand variable mechanism that can vary an interval between the workpiece hands of each pair depending on the characteristics of a workpiece.

CITATION LIST

Patent Literature

PTL 1: Japanese Patent Laying-Open No. 2008-307650

SUMMARY OF INVENTION

Technical Problem

In the workpiece supply and carrying-out device disclosed in PTL 1, a plurality of pairs of workpiece hands are provided and the interval between the workpiece hands of each pair is variable depending on the characteristics of a workpiece so that one of the pairs of workpiece hands grasps an unmachined workpiece and the other pair of workpiece hands grasps a machined workpiece, or two or more of the pairs of workpiece hands grasp a long workpiece.

However, the pairs of workpiece hands are the same in the workpiece grasping direction of the workpiece hands of each pair, and therefore there is a possibility that they cannot make a satisfactory response depending on the shape or machining state of a workpiece to be held.

It is therefore an object of the present invention to solve the above problem and to provide a workpiece holding device that has a simple structure and can select between workpiece grasping directions different from each other and a workpiece conveyance device using such a workpiece holding device.

Solution to Problem

One aspect of the present invention is directed to a workpiece holding device including: a plurality of first claw portions disposed to be spaced apart from each other in a predetermined plane and capable of linearly moving in a direction parallel to the predetermined plane; a second claw portion and a third claw portion disposed to face each other in a direction orthogonal to the predetermined plane; and a motion conversion mechanism portion that converts a linear motion associated with movement of the first claw portion into a linear motion in the direction orthogonal to the predetermined plane, transmits the linear motion to the second claw portion, and causes the second claw portion to linearly move in the direction orthogonal to the predetermined plane. The first claw portion, the second claw portion, and the third claw portion each have a grasping surface to abut against a workpiece to be held, and the grasping surface of the first claw portion is different in shape from the grasping surfaces of the second claw portion and the third claw portion.

Another aspect of the present invention is directed to a workpiece holding device including: a plurality of first claw portions disposed to be spaced apart from each other in a predetermined plane and capable of linearly moving in a direction parallel to the predetermined plane; a second claw portion and a third claw portion disposed to face each other in a direction orthogonal to the predetermined plane; and a motion conversion mechanism portion that converts a linear motion associated with movement of the first claw portion into a linear motion in the direction orthogonal to the predetermined plane, transmits the linear motion to the second claw portion, and causes the second claw portion to linearly move in the direction orthogonal to the predetermined plane. The third claw portion is integrated with the first claw portion.

Still another aspect of the present invention is directed to a workpiece holding device including: a plurality of first claw portions disposed to be spaced apart from each other in a predetermined plane and capable of linearly moving in a direction parallel to the predetermined plane; a second claw portion and a third claw portion disposed to face each other in a direction orthogonal to the predetermined plane; and a motion conversion mechanism portion that converts a linear motion associated with movement of the first claw portion into a linear motion in the direction orthogonal to the predetermined plane, transmits the linear motion to the second claw portion, and causes the second claw portion to linearly move in the direction orthogonal to the predetermined plane. The motion conversion mechanism portion includes: a movement member that has a first inclined surface extending in a diagonal direction relative to the predetermined plane, that is linearly movable in the direction parallel to the predetermined plane together with the first claw portion, and that is supported to be linearly movable in the direction orthogonal to the predetermined plane; and a fixed member having a second inclined surface that is in surface contact with the first inclined surface. The second claw portion is provided in the movement member at a position away from the first inclined surface in the direction orthogonal to the predetermined plane.

Still another aspect of the present invention is directed to a workpiece holding device including: a plurality of first claw portions disposed to be spaced apart from each other in a predetermined plane and capable of linearly moving in a direction parallel to the predetermined plane; a second claw portion and a third claw portion disposed to face each other in a direction orthogonal to the predetermined plane; and a motion conversion mechanism portion that converts a linear motion associated with movement of the first claw portion into a linear motion in the direction orthogonal to the predetermined plane, transmits the linear motion to the second claw portion, and causes the second claw portion to linearly move in the direction orthogonal to the predetermined plane.

In the workpiece holding device having such a configuration, the motion conversion mechanism portion converts a linear motion associated with the movement of the first claw portion into a linear motion in the direction orthogonal to the predetermined plane, transmits the linear motion to the second claw portion, and causes the second claw portion to linearly move in the direction orthogonal to the predetermined plane. This makes it possible to achieve a workpiece holding device that has a simple structure and can select between workpiece grasping in the direction parallel to the predetermined plane by the plurality of first claw portions and workpiece grasping in the direction orthogonal to the predetermined plane by the second claw portion and the third claw portion.

The second claw portion and the third claw portion are preferably provided in positions deviated from the plurality of first claw portions in the direction orthogonal to the predetermined plane.

In the workpiece holding device having such a configuration, when a workpiece is grasped by the plurality of first claw portions, the workpiece is unlikely to interfere with the second claw portion and the third claw portion, and when a workpiece is grasped by the second claw portion and the third claw portion, the workpiece is unlikely to interfere with the plurality of first claw portions.

The third claw portion is preferably integrated with the first claw portion.

The workpiece holding device having such a configuration can have a simpler structure due to a reduction in the number of parts.

The second claw portion and the third claw portion are preferably provided in positions surrounded by the plurality of first claw portions when viewed in the direction orthogonal to the predetermined plane.

In the workpiece holding device having such a configuration, the position of the center of the gravity of a workpiece grasped by the plurality of first claw portions and the position of the center of the gravity of a workpiece grasped by the second claw portion and the third claw portion can get close to each other. This makes it possible to increase the maximum weight of a workpiece that the workpiece holding device can hold while achieving a balance between when a workpiece is grasped by the plurality of first claw portions and when a workpiece is grasped by the second claw portion and the third claw portion.

The motion conversion mechanism portion preferably includes: a movement member that has a first inclined surface extending in a diagonal direction relative to the predetermined plane, that can linearly move in the direction parallel to the predetermined plane together with the first claw portion, and that is supported to be able to linearly move in the direction orthogonal to the predetermined plane; and a fixed member having a second inclined surface that is in surface contact with the first inclined surface. The second claw portion is provided in the movement member at a position away from the first inclined surface in the direction orthogonal to the predetermined plane.

In the workpiece holding device having such a configuration, the movement member linearly moves in the direction parallel to the predetermined plane together with the first claw portion in association with the linear movement of the first claw portion. At this time, the first inclined surface slides in the diagonal direction relative to the predetermined plane while being in surface contact with the second inclined surface so that the movement member linearly moves in the direction orthogonal to the predetermined plane. This makes it possible to cause the second claw portion provided in the movement member to linearly move in the direction orthogonal to the predetermined plane.

The plurality of first claw portions are preferably disposed to be spaced apart from each other in a circumferential direction around a predetermined axis orthogonal to the predetermined plane so that the first claw portions are linearly movable in a radial direction relative to the predetermined axis. The workpiece holding device includes a unit member in which the first claw portion, the third claw portion, and a supporting portion that supports the movement member to allow the movement member to linearly move in the direction orthogonal to the predetermined plane are integrally provided.

The workpiece holding device having such a configuration can have a simpler structure due to a reduction in the number of parts.

The movement member preferably further has a third inclined surface that faces an opposite direction to the first inclined surface. The fixed member further has a fourth inclined surface that faces an opposite direction to the second inclined surface and that is in surface contact with the third inclined surface.

In the workpiece holding device having such a configuration, the first inclined surface and the third inclined surface slide in the diagonal direction relative to the predetermined plane while being in surface contact with the second inclined surface and the fourth inclined surface, respectively so that the movement member linearly moves in the direction orthogonal to the predetermined plane. This makes it possible to cause the second claw portion provided in the movement member to linearly move in the direction orthogonal to the predetermined plane.

A workpiece conveyance device according to the present invention includes any one of the workpiece holding devices described above to convey a workpiece held by the workpiece holding device.

The workpiece conveyance device having such a configuration can select between workpiece grasping in the direction parallel to the predetermined plane by the plurality of first claw portions and workpiece grasping in the direction orthogonal to the predetermined plane by the second claw portion and the third claw portion depending on the shape or machining state of a workpiece to be conveyed.

Advantageous Effects of Invention

As has been described above, the present invention makes it possible to provide a workpiece holding device that has a simple structure and can select between workpiece grasping directions different from each other and a workpiece conveyance device using such a workpiece holding device.

DESCRIPTION OF EMBODIMENTS

Figure 1:
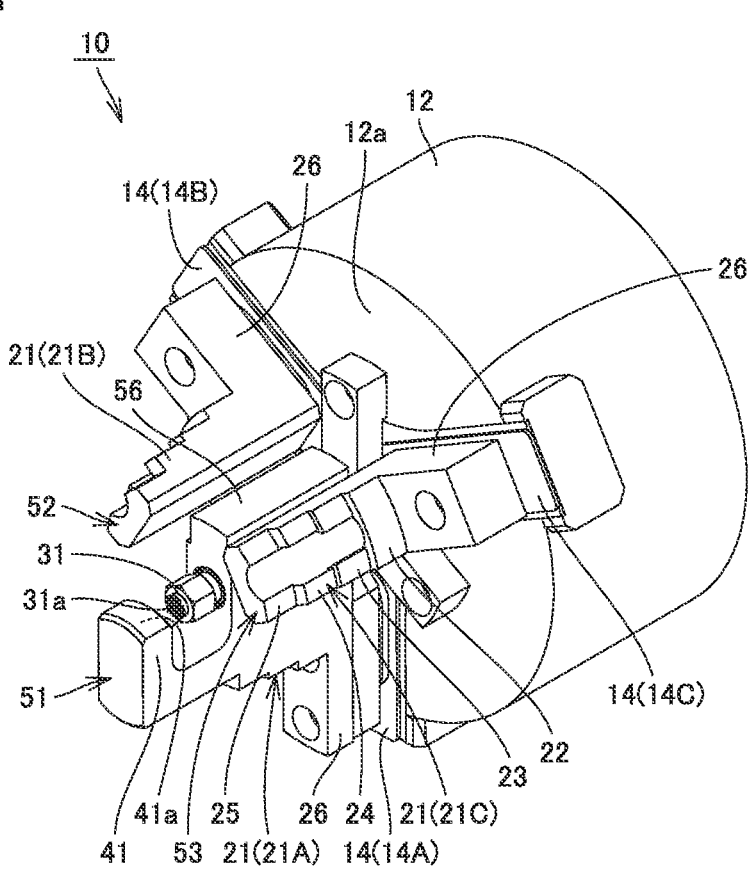
FIG. 1 is a perspective view of a workpiece holding device according to an embodiment of the present invention.

Embodiments of the present invention will be described with reference to the drawings. It should be noted that in the drawings referred to below, the same reference numerals indicate the same or corresponding components.

Figure 2:
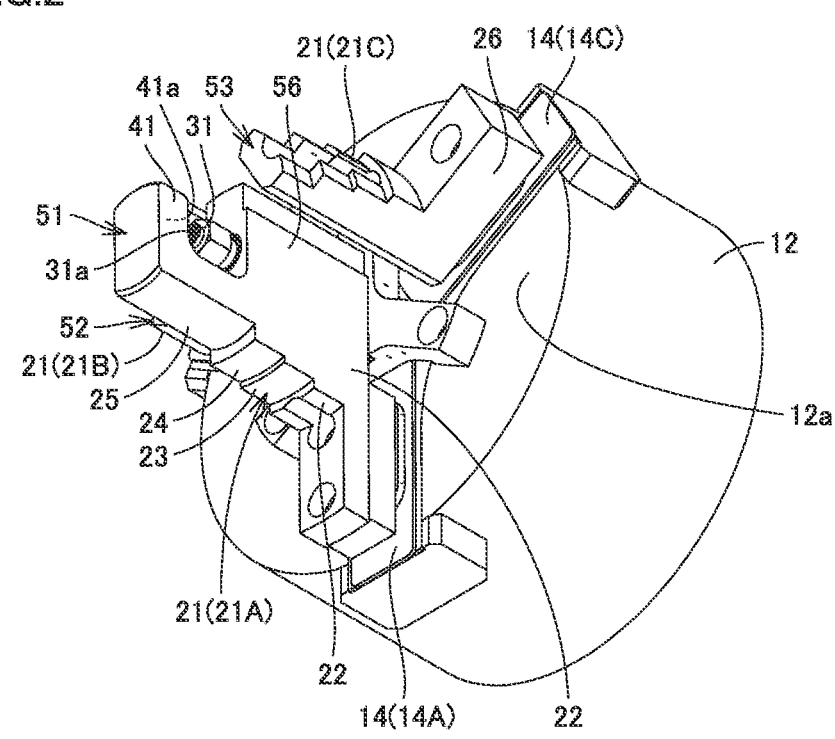
FIG. 2 is another perspective view of the workpiece holding device according to the embodiment of the present invention.
Figure 3:
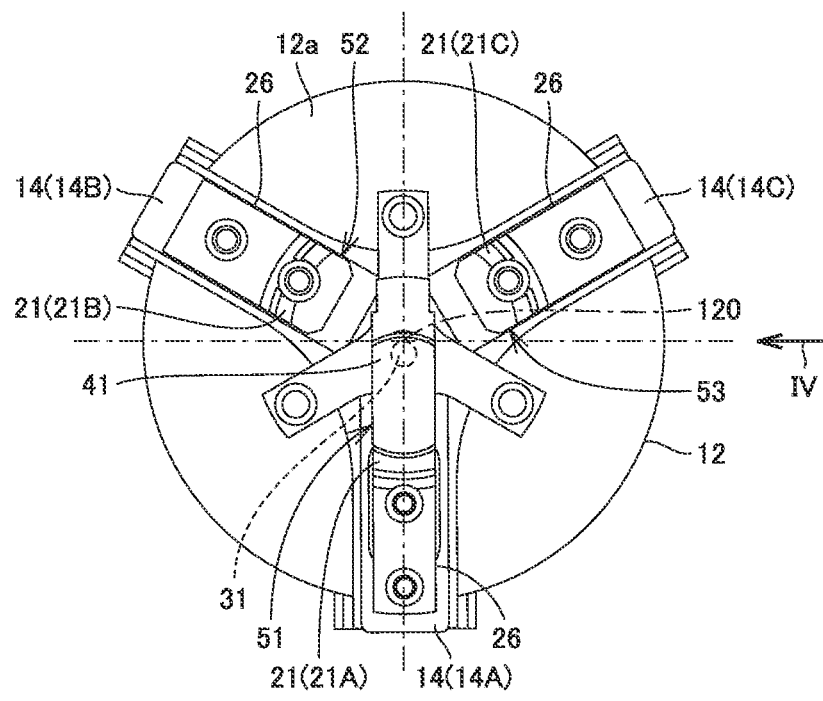
FIG. 3 is a front view of the workpiece holding device shown in FIG. 1 and FIG. 2.
Figure 4:
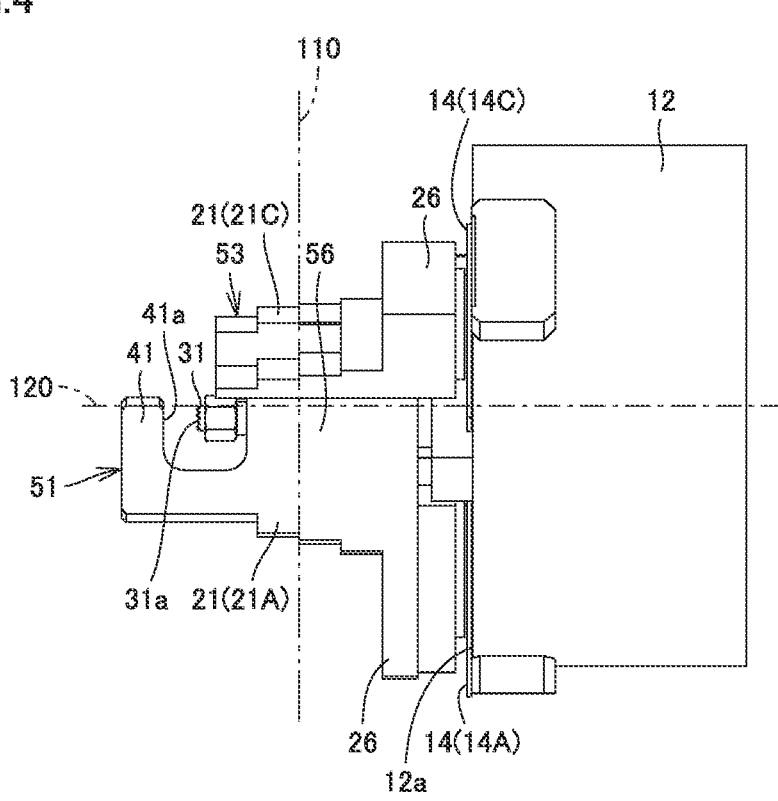
FIG. 4 is a side view of the workpiece holding device when viewed in a direction indicated by an arrow IV shown in FIG. 3.

FIG. 1 and FIG. 2 are perspective views of a workpiece holding device according to an embodiment of the present invention. FIG. 3 is a front view of the workpiece holding device shown in FIG. 1 and FIG. 2. FIG. 4 is a side view of the workpiece holding device when viewed in a direction indicated by an arrow IV shown in FIG. 3.

Figure 5:
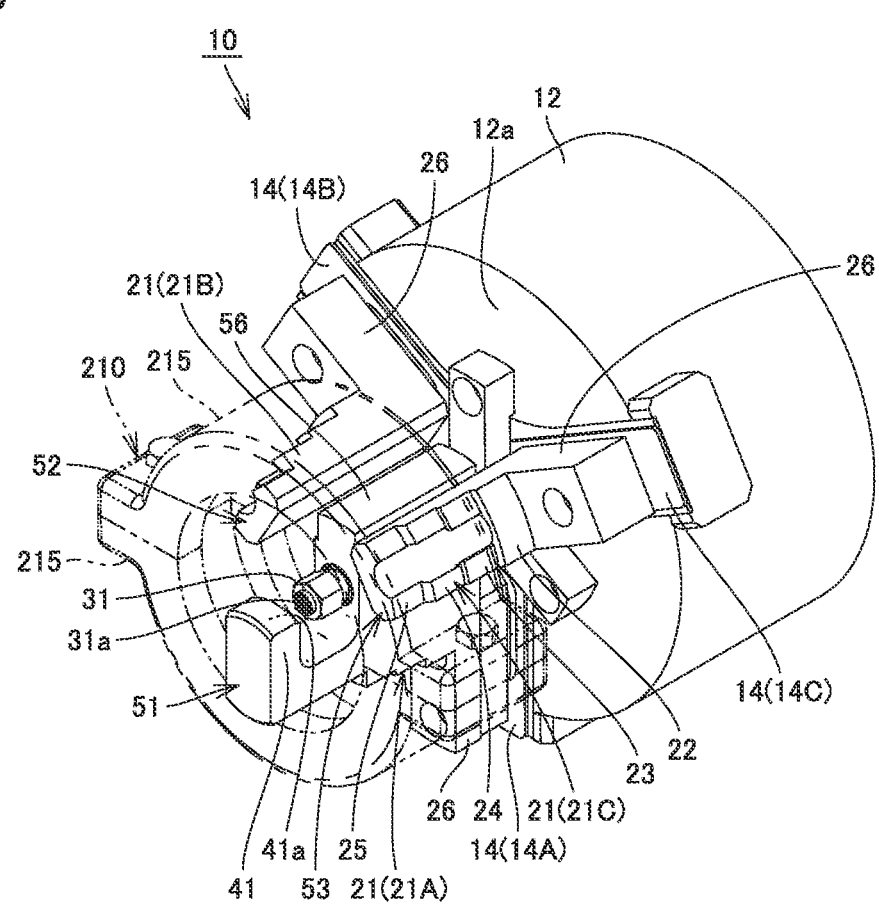
FIG. 5 is a perspective view showing a first holding form of a workpiece by the workpiece holding device shown in FIG. 1.
Figure 6:
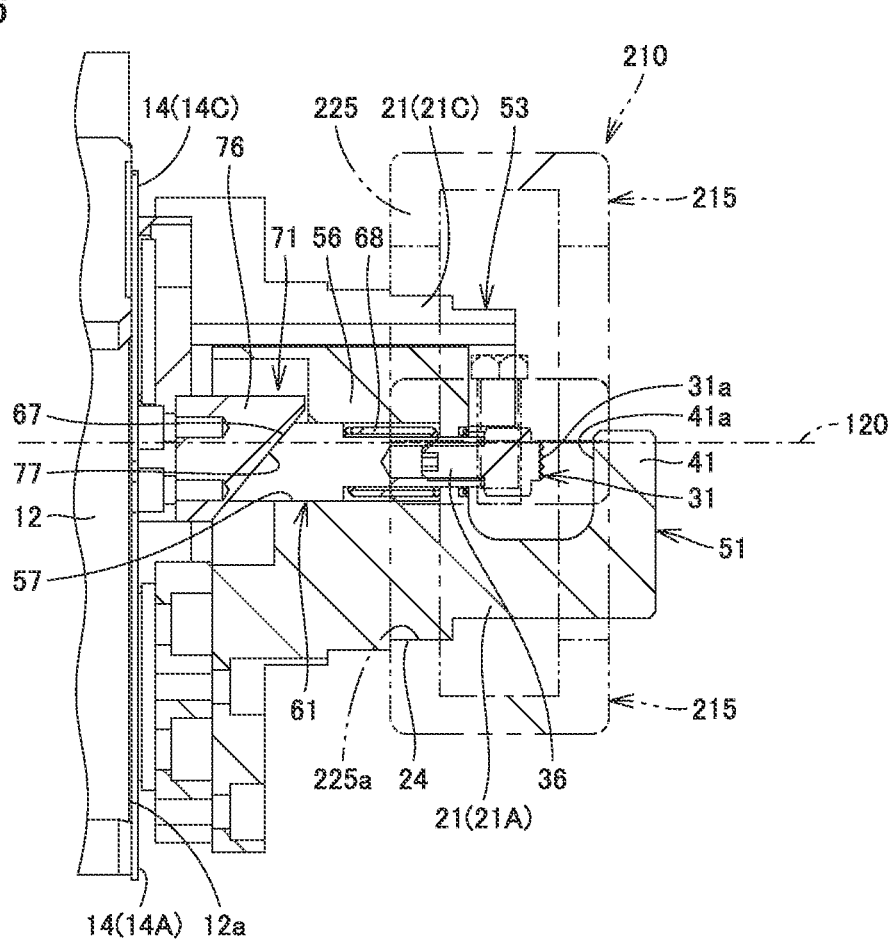
FIG. 6 is a sectional view showing the first holding form (clamping state) of a workpiece shown in FIG. 5.
Figure 7:
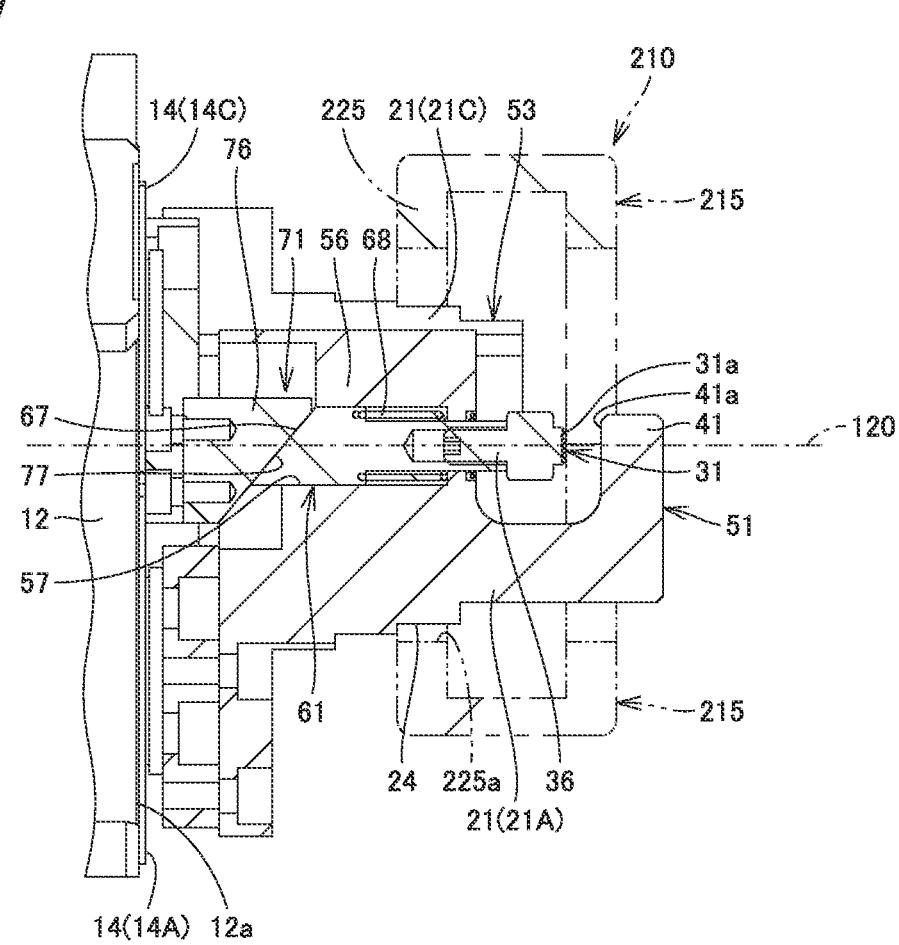
FIG. 7 is a sectional view showing the first holding form (unclamping state) of a workpiece shown in FIG. 5.
Figure 8:
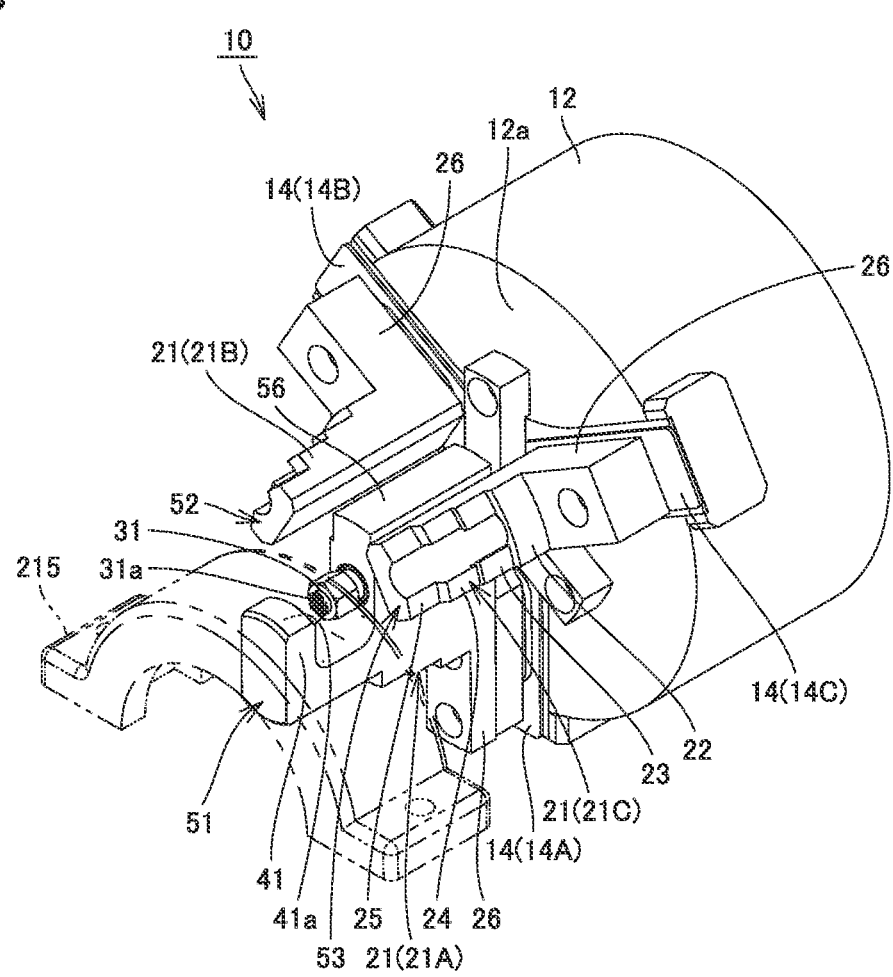
FIG. 8 is a perspective view showing a second holding form of a workpiece by the workpiece holding device shown in FIG. 1.
Figure 9:
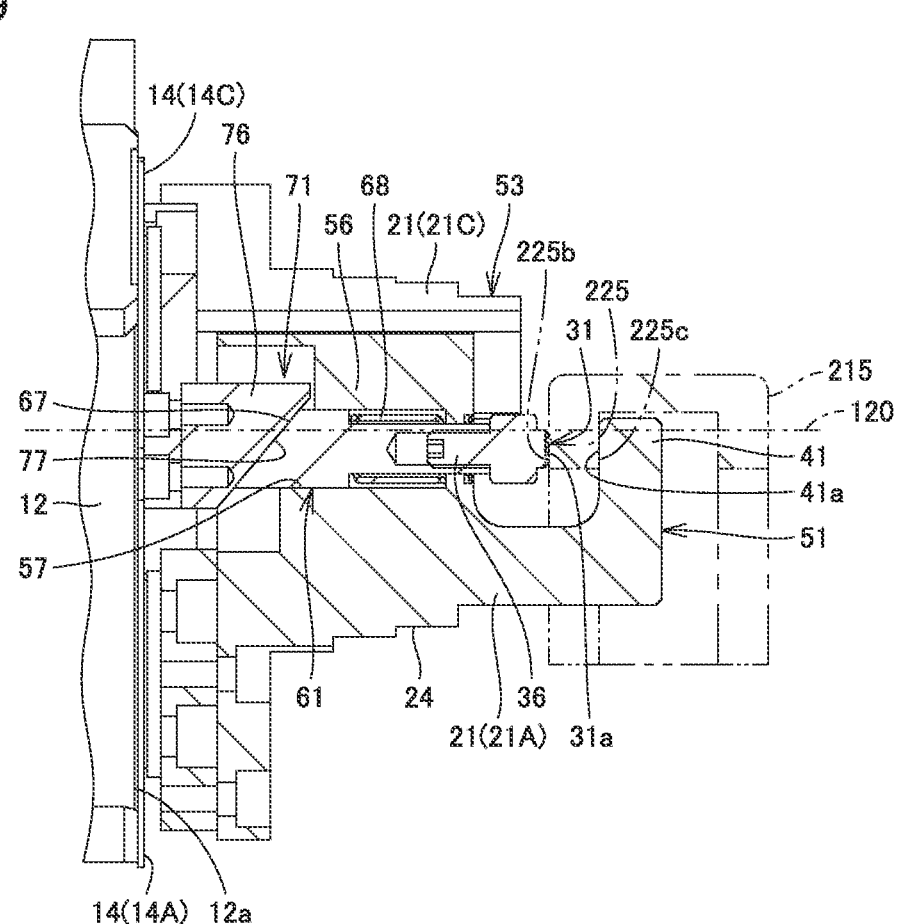
FIG. 9 is a sectional view showing the second holding form (clamping state) of a workpiece shown in FIG. 8.
Figure 10:
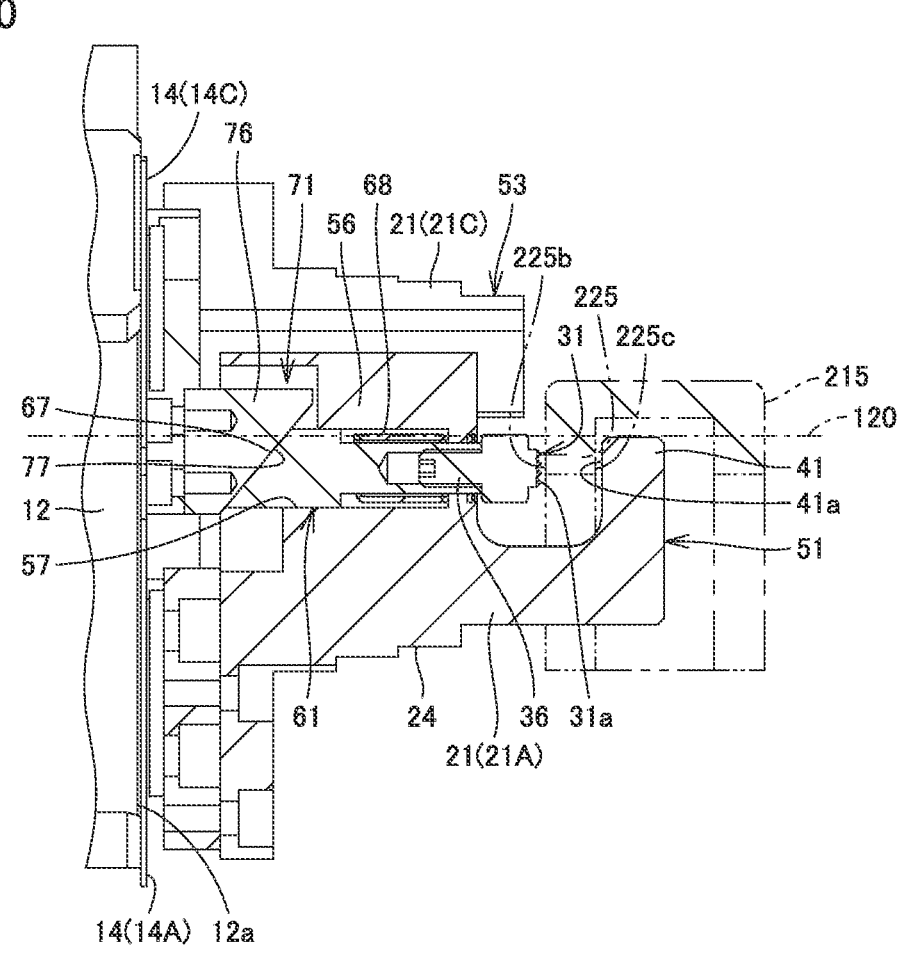
FIG. 10 is a sectional view showing the second holding form (unclamping state) of a workpiece shown in FIG. 8.

FIG. 5 is a perspective view showing a first holding form of a workpiece by the workpiece holding device shown in FIG. 1. FIG. 6 is a sectional view showing the first holding form (clamping state) of a workpiece shown in FIG. 5. FIG. 7 is a sectional view showing the first holding form (unclamping state) of a workpiece shown in FIG. 5. FIG. 8 is a perspective view showing a second holding form of a workpiece by the workpiece holding device shown in FIG. 1. FIG. 9 is a sectional view showing the second holding form (clamping state) of a workpiece shown in FIG. 8. FIG. 10 is a sectional view showing the second holding form (unclamping state) of a workpiece shown in FIG. 8.

With reference to FIG. 1 to FIG. 10, a workpiece holding device 10 according to the present embodiment is a device for holding a workpiece.

Workpiece holding device 10 has a plurality of first claw portions 21 (21A, 21B, 21C). First claw portions 21 each have a claw shape so that a workpiece can be grasped by first claw portions 21.

First claw portions 21 are disposed to be spaced apart from each other in a predetermined plane 110 shown in FIG. 4. First claw portions 21 each can linearly move in a direction parallel to predetermined plane 110. First claw portions 21 are disposed to be spaced apart from each other in a circumferential direction around a central axis 120. First claw portions 21 are disposed at regular intervals in the circumferential direction around central axis 120.

Central axis 120 extends in a direction orthogonal to predetermined plane 110. First claw portions 21 linearly move in a radial direction relative to central axis 120. First claw portions 21 linearly move in the radial direction relative to central axis 120 while synchronizing with each other.

First claw portions 21 each have a first grasping surface 22, a second grasping surface 23, a third grasping surface 24, and a fourth grasping surface 25.

First grasping surface 22, second grasping surface 23, third grasping surface 24, and fourth grasping surface 25 are arranged in the axial direction of central axis 120 in this order. First grasping surface 22 is disposed nearest to a base member 12 (end face 12a) that will be described later in the axial direction of central axis 120, and fourth grasping surface 25 is disposed farthest from base member 12 (end face 12a) that will be described later in the axial direction of central axis 120.

First grasping surface 22, second grasping surface 23, third grasping surface 24, and fourth grasping surface 25 are provided in such a manner that there is, in the radial direction relative to central axis 120, a height difference between the grasping surfaces adjacent to each other in the axial direction of central axis 120. Among first grasping surface 22, second grasping surface 23, third grasping surface 24, and fourth grasping surface 25, first grasping surface 22 is largest in diameter. The diameter of second grasping surface 23 is smaller than that of first grasping surface 22, the diameter of third grasping surface 24 is smaller than that of second grasping surface 23, and the diameter of fourth grasping surface 25 is smaller than that of third grasping surface 24. Among first grasping surface 22, second grasping surface 23, third grasping surface 24, and fourth grasping surface 25, fourth grasping surface 25 is smallest in diameter.

First claw portions 21 are the same in the diameter of first grasping surface 22, the diameter of second grasping surface 23, the diameter of third grasping surface 24, and the diameter of fourth grasping surface 25. First claw portions 21 linearly move in the radial direction relative to central axis 120 while maintaining the above relationship that first claw portions 21 are the same in the diameters of the grasping surfaces.

In the first holding form of a workpiece shown in FIG. 5 to FIG. 7, first claw portions 21 grasp a workpiece 210.

Workpiece 210 has a cylindrical shape as a whole and is provided with, at the end in the axial direction thereof, an inner flange portion 225 folded inward in the radial direction.

As shown in FIG. 5 and FIG. 6, third grasping surfaces 24 of first claw portions 21 abut against an inner circumferential surface 225a of inner flange portion 225 in the radial direction relative to central axis 120 due to the outward-directed linear movement of first claw portions 21 in the radial direction relative to central axis 120. In this way, a clamping state is achieved in which workpiece 210 is grasped by first claw portions 21 from the inside in the radial direction relative to central axis 120. In the first holding form, workpiece 210 is grasped in a direction parallel to predetermined plane 110, more specifically in the radial direction relative to central axis 120 included in predetermined plane 110.

As shown in FIG. 7, third grasping surfaces 24 of first claw portions 21 separate from inner circumferential surface 225a of inner flange portion 225 due to the inward-directed linear movement of first claw portions 21 in the radial direction relative to central axis 120. In this way, an unclamping state is achieved in which grasping of workpiece 210 by first claw portions 21 is cancelled.

It should be noted that a position where first claw portions 21 grasp a workpiece is any of first grasping surface 22, second grasping surface 23, third grasping surface 24, and fourth grasping surface 25. Since first claw portions 21 are each configured to have a stepped grasping surface, a wide variety of workpieces different in inner diameter can be grasped. Further, grasping of a workpiece by the first claw portions is not limited to inner diameter grasping (inner clamping) of a workpiece described above, and may be outer diameter grasping such that the first claw portions abut against the outer circumferential surface of a workpiece.

The present embodiment has been described with reference to a case where the first holding form of a workpiece is achieved by three first claw portions 21 (21A, 21B, 21C), but the number of first claw portions in the present invention is not limited to three as long as it is two or more. For example, when the workpiece holding device has two first claw portions, the two first claw portions may be disposed on the same straight line included in the predetermined plane to linearly move on the same straight line.

Workpiece holding device 10 further has a second claw portion 31, a third claw portion 41, and a motion conversion mechanism portion 71. Second claw portion 31 and third claw portion 41 each have a claw shape so that a workpiece can be grasped by second claw portion 31 and third claw portion 41.

Motion conversion mechanism portion 71 converts a linear motion associated with movement of first claw portion 21 into a linear motion in the direction orthogonal to predetermined plane 110, transmits the linear motion to second claw portion 31, and causes second claw portion 31 to linearly move in the direction orthogonal to predetermined plane 110. It should be noted that a specific configuration of motion conversion mechanism portion 71 will be described later in detail.

Second claw portion 31 and third claw portion 41 are disposed to face each other in the direction orthogonal to predetermined plane 110. Second claw portion 31 is disposed nearer to base member 12 (end face 12a) that will be described later in the direction orthogonal to predetermined plane 110, and third claw portion 41 is disposed farther from base member 12 (end face 12a) that will be described later in the direction orthogonal to predetermined plane 110.

Second claw portion 31 can linearly move in the direction orthogonal to predetermined plane 110. Third claw portion 41 cannot linearly move in the direction orthogonal to predetermined plane 110.

Second claw portion 31 has a grasping surface 31a. Third claw portion 41 has a grasping surface 41a. Grasping surface 31a and grasping surface 41a are disposed in parallel with predetermined plane 110. Grasping surface 31a and grasping surface 41a face each other in the direction orthogonal to predetermined plane 110. The distance between grasping surface 31a and grasping surface 41a in the direction orthogonal to predetermined plane 110 increases or decreases in association with the linear movement of second claw portion 31.

Second claw portion 31 and third claw portion 41 are provided in positions deviated from first claw portions 21 in the direction orthogonal to predetermined plane 110. Grasping surface 31a and grasping surface 41a are provided in positions deviated from first grasping surface 22, second grasping surface 23, third grasping surface 24, and fourth grasping surface 25 in the direction orthogonal to predetermined plane 110.

Second claw portion 31 and third claw portion 41 are provided in positions surrounded by first claw portions 21 when viewed in the direction orthogonal to predetermined plane 110. When viewed in the direction orthogonal to predetermined plane 110, grasping surface 31a and grasping surface 41a are provided on the inner side of circumferential surfaces in which first grasping surfaces 22, second grasping surfaces 23, third grasping surfaces 24, and fourth grasping surfaces 25 of first claw portions 21 extend.

In the second holding form of a workpiece shown in FIG. 8 to FIG. 10, second claw portion 31 and third claw portion 41 grasp a workpiece 215.

Workpiece 215 is a part constituting workpiece 210 shown in FIG. 5 to FIG. 7. Workpiece 215 has, as a whole, a semicylindrical shape obtained by halving workpiece 210. Workpiece 210 is obtained by combining two workpieces 215 using bolts or the like.

As shown in FIG. 8 and FIG. 9, grasping surface 31a of second claw portion 31 abuts against an end face 225b of inner flange portion 225 in the direction orthogonal to predetermined plane 110 and grasping surface 41a of third claw portion 41 abuts against an end face 225c of inner flange portion 225 in the direction orthogonal to predetermined plane 110 due to the linear movement of second claw portion 31 toward a direction getting close to third claw portion 41 in the direction orthogonal to predetermined plane 110. In this way, a clamping state is achieved in which workpiece 215 is grasped by second claw portion 31 and third claw portion 41.

In the second holding form, workpiece 215 is grasped in the direction orthogonal to predetermined plane 110 (in the axial direction of central axis 120). The workpiece 210 grasping direction in the first holding form and the workpiece 215 grasping direction in the second holding form are orthogonal to each other.

As shown in FIG. 10, grasping surface 31a of second claw portion 31 separates from end face 225b of inner flange portion 225 due to the linear movement of second claw portion 31 toward a direction getting away from third claw portion 41 in the direction orthogonal to predetermined plane 110. In this way, an unclamping state is achieved in which grasping of workpiece 215 by second claw portion 31 and third claw portion 41 is cancelled.

Such a configuration makes it possible to achieve workpiece holding device 10 that has a simple structure and can select between grasping of workpiece 210 by first claw portions 21 in the direction parallel to predetermined plane 110 and gasping of workpiece 215 by second claw portion 31 and third claw portion 41 in the direction orthogonal to predetermined plane 110, because motion conversion mechanism portion 71 converts a linear motion associated with movement of first claw portion 21 into a linear motion in the direction orthogonal to predetermined plane 110, transmits the linear motion to second claw portion 31, and causes second claw portion 31 to linearly move in the direction orthogonal to predetermined plane 110.

Second claw portion 31 and third claw portion 41 are provided in positions deviated from first claw portions 21 in the direction orthogonal to predetermined plane 110. Due to such a configuration, workpiece 210 is unlikely to interfere with second claw portion 31 and third claw portion 41 when first claw portions 21 grasp workpiece 210. Further, workpiece 215 is unlikely to interfere with first claw portions 21 when second claw portion 31 and third claw portion 41 grasp workpiece 215.

Second claw portion 31 and third claw portion 41 are provided in positions surrounded by first claw portions 21 when viewed in the direction orthogonal to predetermined plane 110. Due to such a configuration, the position of the center of the gravity of workpiece 210 grasped by first claw portions 21 and the position of the center of the gravity of workpiece 215 grasped by second claw portion 31 and third claw portion 41 can get close to each other. This makes it possible to increase the maximum weight of a workpiece that workpiece holding device 10 can hold while achieving a balance between when a workpiece is grasped by first claw portions 21 and when a workpiece is grasped by second claw portion 31 and third claw portion 41.

Next, a more specific configuration of workpiece holding device 10 will be described. With reference to FIG. 1 to FIG. 4, workpiece holding device 10 further has a base member 12 and a plurality of sliders 14 (14A, 14B, 14C). Base member 12 is a member for supporting first claw portions 21, second claw portion 31, and third claw portion 41. Base member 12 has an end face 12a. End face 12a is a plane parallel to predetermined plane 110.

Sliders 14 are provided on end face 12a. Base member 12 includes a built-in actuator (not shown) for driving sliders 14. Sliders 14 (14A, 14B, 14C) can linearly move in the direction parallel to predetermined plane 110 (in the radial direction relative to central axis 120) by receiving output from the actuator. First claw portion 21A, first claw portion 21B, first claw portion 21C are fixed to slider 14A, slider 14B, and slider 14C, respectively.

Workpiece holding device 10 has a first unit member 51, a second unit member 52, and a third unit member 53. First unit member 51, second unit member 52, and third unit member 53 are each constituted from a metallic block body.

First unit member 51 has first claw portion 21A, third claw portion 41, a base portion 26, and a supporting portion 56. In first unit member 51, first claw portion 21A, third claw portion 41, base portion 26, and supporting portion 56 are integrally provided. Third claw portion 41 is integrated with first claw portion 21A.

Base portion 26 lies on end face 12a. Base portion 26 has a plate shape having a thickness in the axial direction of central axis 120 and extending in the radial direction relative to central axis 120. Base portion 26 of first unit member 51 is fastened to slider 14A with a bolt or the like.

First claw portion 21A is provided so as to project from base portion 26 toward a direction getting away from base member 12 (end face 12a) in the axial direction of central axis 120.

Supporting portion 56 is provided so as to project from base portion 26 toward the direction getting away from base member 12 (end face 12a) in the axial direction of central axis 120. Supporting portion 56 is provided to be aligned with first claw portion 21A in the radial direction relative to central axis 120. Supporting portion 56 is disposed on the inner side of first claw portion 21A in the radial direction relative to central axis 120. Supporting portion 56 supports a movement member 61 that will be described later so that movement member 61 can linearly move in the direction orthogonal to predetermined plane 110.

Third claw portion 41 is provided at the tip of first claw portion 21A projecting from base portion 26. Third claw portion 41 is provided so as to inwardly bend at the tip of first claw portion 21A toward the radial direction relative to central axis 120. Third claw portion 41 faces supporting portion 56 with a space in between in the direction orthogonal to predetermined plane 110. Third claw portion 41 is provided on the opposite side of base member 12 with respect to first claw portion 21A in the direction orthogonal to predetermined plane 110.

Second unit member 52 has first claw portion 21B and base portion 26. In second unit member 52, first claw portion 21B and base portion 26 are integrally provided. Third unit member 53 has first claw portion 21C and base portion 26. In third unit member 53, first claw portion 21C and base portion 26 are integrally provided.

Base portion 26 lies on end face 12a. Base portion 26 has a plate shape having a thickness in the axial direction of central axis 120 and extending in the radial direction relative to central axis 120. Base portion 26 of second unit member 52 is fastened to slider 14B with a bolt or the like. Base portion 26 of third unit member 53 is fastened to slider 14C with a bolt or the like.

First claw portion 21B is provided so as to project from base portion 26 toward the direction getting away from base member 12 (end face 12a) in the axial direction of central axis 120. First claw portion 21C is provided so as to project from base portion 26 toward the direction getting away from base member 12 (end face 12a) in the axial direction of central axis 120. Third unit member 53 has the same shape as second unit member 52.

With reference to FIG. 1 to FIG. 10, motion conversion mechanism portion 71 has a movement member 61 and a fixed member 76. Movement member 61 is provided in first unit member 51. Movement member 61 is built into first unit member 51. Movement member 61 is provided with second claw portion 31.

Fixed member 76 is fixed to base member 12. Fixed member 76 is provided on end face 12a. Fixed member 76 is fastened to base member 12 with a bolt or the like. Fixed member 76 is provided between base member 12 (end face 12a) and movement member 61 in the direction orthogonal to predetermined plane 110.

Movement member 61 is constituted from a shaft body extending in the direction orthogonal to predetermined plane 110. Movement member 61 has a first inclined surface 67. Fixed member 76 is constituted from a block body. Fixed member 76 has a second inclined surface 77.

Second inclined surface 77 includes a plane. Second inclined surface 77 is provided at a position away from end face 12a in the direction orthogonal to predetermined plane 110.

Second inclined surface 77 extends in a diagonal direction relative to predetermined plane 110. Central axis 120 diagonally intersects with second inclined surface 77. The length between end face 12a and second inclined surface 77 in the direction orthogonal to predetermined plane 110 varies along with the position in the radial direction relative to central axis 120. The length between end face 12a and second inclined surface 77 in the direction orthogonal to predetermined plane 110 varies along with the movement direction of first claw portion 21A.

First inclined surface 67 includes a plane. First inclined surface 67 extends in parallel with second inclined surface 77. First inclined surface 67 is in surface contact with second inclined surface 77. The length of first inclined surface 67 in the radial direction relative to central axis 120 (in the movement direction of first claw portion 21A) is smaller than that of second inclined surface 77 in the radial direction relative to central axis 120 (in the movement direction of first claw portion 21A).

Movement member 61 is supported by supporting portion 56 so that movement member 61 can linearly move in the direction orthogonal to predetermined plane 110.

Supporting portion 56 is provided with an insertion hole 57. Insertion hole 57 extends in the direction orthogonal to predetermined plane 110. Insertion hole 57 opens at a position facing grasping surface 41a at one of ends in the direction orthogonal to predetermined plane 110 and opens at a position facing second inclined surface 77 at the other end in the direction orthogonal to predetermined plane 110. In insertion hole 57, movement member 61 is inserted.

Second claw portion 31 is provided in movement member 61 at a position away from first inclined surface 67 in the direction orthogonal to predetermined plane 110. Movement member 61 extends from first inclined surface 67 toward a direction getting away from fixed member 76 in the direction orthogonal to predetermined plane 110. Second claw portion 31 is provided at the tip of movement member 61 extending from first inclined surface 67 toward the direction getting away from fixed member 76. Second claw portion 31 is constituted from a shaft body, an end face on one side in the axial direction thereof corresponds to grasping surface 31a, and a screw portion 36 is provided on the other side in the axial direction thereof. Screw portion 36 is threadedly engaged with movement member 61.

Motion conversion mechanism portion 71 further has an elastic member 68. Elastic member 68 is constituted from a coil spring. Elastic member 68 is disposed inside insertion hole 57 and on the outer periphery of movement member 61. Elastic member 68 exerts an elastic force on movement member 61 in a direction in which first inclined surface 67 is urged toward second inclined surface 77.

Due to such a configuration, movement member 61 is supported by supporting portion 56, which is integrated with first claw portion 21, of first unit member 51, and therefore during the linear movement of first claw portion 21A, movement member 61 linearly moves together with first claw portion 21A in the direction parallel to predetermined plane 110 (in the radial direction relative to central axis 120). At this time, first inclined surface 67 slides in the diagonal direction relative to predetermined plane 110 while being in surface contact with second inclined surface 77 so that movement member 61 linearly moves in the direction orthogonal to predetermined plane 110. This makes it possible to cause second claw portion 31 provided in movement member 61 to linearly move in the direction orthogonal to predetermined plane 110.

Third claw portion 41 is integrated with first claw portion 21A. In first unit member 51, first claw portion 21A, third claw portion 41, and supporting portion 56 for supporting movement member 61 are integrally provided. Workpiece holding device 10 having such a configuration can have a simpler structure due to a reduction in the number of parts.

Figure 11:
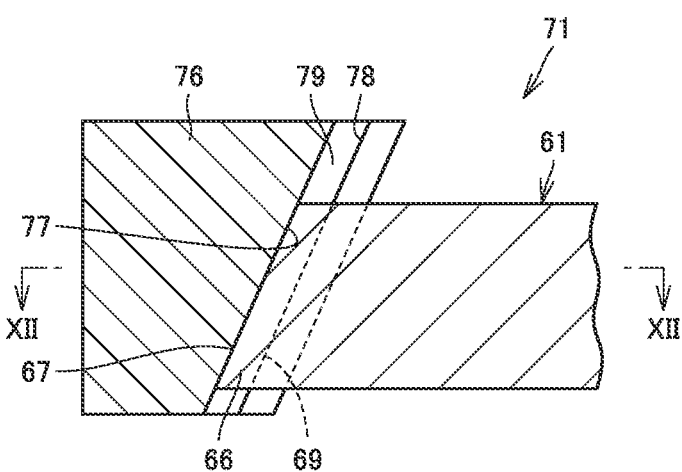
FIG. 11 is a sectional view of a modification of a motion conversion mechanism portion shown in FIG. 6.
Figure 12:
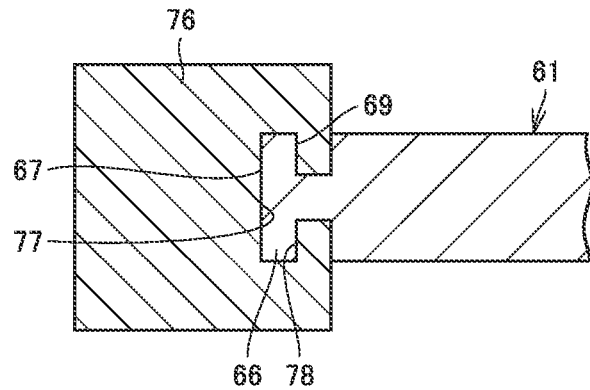
FIG. 12 is a sectional view of the modification of the motion conversion mechanism portion taken along a line XII-XII shown in FIG. 11.

FIG. 11 is a sectional view of a modification of the motion conversion mechanism portion shown in FIG. 6. FIG. 12 is a sectional view of the modification of the motion conversion mechanism portion taken along a line XII-XII shown in FIG. 11. In FIG. 11 and FIG. 12, fixed member 76 and part of movement member 61 engaged with fixed member 76 are shown.

With reference to FIG. 11 and FIG. 12, movement member 61 has a first inclined surface 67 and a third inclined surface 69. First inclined surface 67 and third inclined surface 69 each include a plane. Third inclined surface 69 faces the opposite direction to first inclined surface 67. Fixed member 76 has a second inclined surface 77 and a fourth inclined surface 78. Second inclined surface 77 and fourth inclined surface 78 each include a plane. Fourth inclined surface 78 faces the opposite direction to second inclined surface 77. Second inclined surface 77 is in surface contact with first inclined surface 67. Fourth inclined surface 78 is in surface contact with third inclined surface 69.

More specifically, movement member 61 has a key portion 66. Key portion 66 extends in the diagonal direction relative to predetermined plane 110 so that first inclined surface 67 and third inclined surface 69 are formed on the front and rear sides thereof in a direction orthogonal to the direction in which key portion 66 extends.

Fixed member 76 is provided with a groove portion 79. Groove portion 79 extends in the diagonal direction relative to predetermined plane 110 so that second inclined surface 77 and fourth inclined surface 78 are formed as inner walls so as to face each other in a direction orthogonal to the direction in which groove portion 79 extends.

Insertion of key portion 66 into groove portion 79 allows second inclined surface 77 and fourth inclined surface 78 to be in surface contact with first inclined surface 67 and third inclined surface 69, respectively.

Due to such a configuration, first inclined surface 67 and third inclined surface 69 slide in the diagonal direction relative to predetermined plane 110 while being in surface contact with second inclined surface 77 and fourth inclined surface 78, respectively so that movement member 61 linearly moves in the direction orthogonal to predetermined plane 110. This makes it possible to cause second claw portion 31 to linearly move in the direction orthogonal to predetermined plane 110 without using elastic member 68 shown in FIG. 6 and FIG. 7. Non-use of elastic member 68 makes it possible to prevent breakage of elastic member 68 as much as possible and further to prevent inhibition of in-and-out movement of movement member 61 due to malfunction of elastic member 68.

It should be noted that the motion conversion mechanism portion in the present invention is not limited to one used in the present embodiment which is configured using surface contact between inclined surfaces. For example, the motion conversion mechanism portion may be configured using a link mechanism or a cam mechanism capable of converting the linear motion of the first claw portion parallel to the predetermined plane into a linear motion in the direction orthogonal to the predetermined plane.

Figure 13:
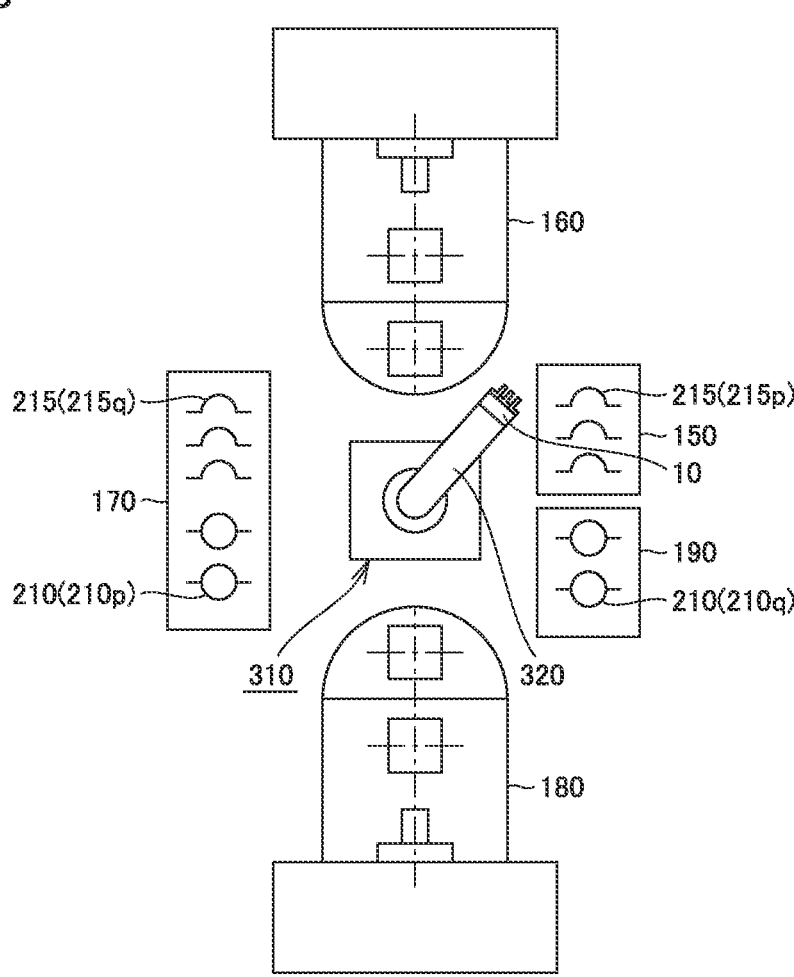
FIG. 13 is a schematic plan view of a workpiece conveyance device using the workpiece holding device shown in FIG. 1.

FIG. 13 is a schematic plan view of a workpiece conveyance device using the workpiece holding device shown in FIG. 1.

With reference to FIG. 13, a workpiece conveyance device 310 has workpiece holding device 10. Workpiece conveyance device 310 conveys a workpiece held by workpiece holding device 10.

Workpiece conveyance device 310 further has a robot arm 320. Robot arm 320 is, for example, a robot arm that can control six axes. Workpiece holding device 10 is provided in robot arm 320. Workpiece holding device 10 is attached as an end effector at the tip of robot arm 320.

Around workpiece conveyance device 310, a workpiece material placing table 150, a first machine tool 160, a workpiece assembly table 170, a second machine tool 180, and a completed workpiece placing table 190 are provided.

On workpiece material placing table 150, materials 215p of workpieces 215 are placed. In the second holding form shown in FIG. 8 to FIG. 10, material 215p of workpiece 215 is grasped using second claw portion 31 and third claw portion 41 grasp. Robot arm 320 is driven to convey material 215p of workpiece 215 from workpiece material placing table 150 to first machine tool 160.

Then, material 215p of workpiece 215 is machined by first machine tool 160 to obtain an intermediate machined material 215q of workpiece 215. Then, two intermediate machined materials 215q are assembled on workpiece assembly table 170 to obtain an assembled body 210p of workpiece 210. Then, assembled body 210p for workpiece 210 is subjected to final machining (finish machining) by second machine tool 180 to obtain a completed article 210q of workpiece 210.

In the first holding form shown in FIG. 5 to FIG. 7, completed article 210q of workpiece 210 is grasped by first claw portions 21. Robot arm 320 is driven to convey completed article 210q of workpiece 210 from second machine tool 180 to completed workpiece placing table 190.

Such a configuration makes it possible to select between workpiece grasping in the first holding form using first claw portions 21 and workpiece grasping in the second holding form using second claw portion 31 and third claw portion 41 depending on the shape or machining state of a workpiece to be conveyed.

More specifically, material 215$p$ of workpiece 215 has a semicylindrical shape and therefore cannot be grasped by inner diameter grasping. However, since material 215$p$ of workpiece 215 is in an unmachined state, it is not necessary to seriously care about generation of flaws on a workpiece surface caused by workpiece grasping. Therefore, workpiece grasping in the second holding form using second claw portion 31 and third claw portion 41 is selected for conveyance of material 215$p$ of workpiece 215 from workpiece material placing table 150 to first machine tool 160.

Completed article 210$q$ of workpiece 210 has a cylindrical shape and inner circumferential surface 225$a$ of inner flange portion 225 has been subjected to finish machining, which makes it possible to grasp completed article 210$q$ of workpiece 210 by inner diameter grasping. Further, completed article 210$q$ of workpiece 210 has been subjected to finish machining, and therefore it is necessary to avoid generation of flaws on a workpiece surface caused by workpiece grasping. Therefore, workpiece grasping in the first holding form using first claw portions 21 is selected for conveyance of completed article 210$q$ of workpiece 210 from second machine tool 180 to completed workpiece placing table 190.

As described above, the use of workpiece holding device 10 that can select between workpiece grasping in the first holding form and workpiece grasping in the second holding form makes it possible to use robot arm 320 for both conveyance of material 215$p$ of workpiece 215 from workpiece material placing table 150 to first machine tool 160 and conveyance of completed material 210$q$ of workpiece 210 from second machine tool 180 to completed workpiece placing table 190.

It should be noted that workpiece holding device 10 may be used for, for example, a gantry loader that can convey a workpiece in three axial directions instead of the robot arm.

The embodiments disclosed herein are illustrative in all aspects and should not be construed as restrictive. The scope of the present invention is defined by claims rather than the above description, and is intended to include all modifications within the spirit and scope equivalent to the claims.

INDUSTRIAL APPLICABILITY

The present invention is applied mainly to a workpiece holding device including claw members for grasping a workpiece.

REFERENCE SIGNS LIST

10: workpiece holding device, 12: base member, 12$a$, 225$b$, 225$c$: end face, 14, 14A, 14B, 14C: slider, 21, 21A, 21B, 21C: first claw portion, 22: first grasping surface, 23: second grasping surface, 24: third grasping surface, 25: fourth grasping surface, 26: base portion, 31: second claw portion, 31$a$, 41$a$: grasping surface, 36: screw portion, 41: third claw portion, 51: first unit member, 52: second unit member, 53: third unit member, 56: supporting portion, 57: insertion hole, 61: movement member, 66: key portion, 67: first inclined surface, 68: elastic member, 69: third inclined surface, 71: motion conversion mechanism portion, 76: fixed member, 77: second inclined surface, 78: fourth inclined surface, 79: groove portion, 110: predetermined plane, 120: central axis, 150: workpiece material placing table, 160: first machine tool, 170: workpiece assembly table, 180: second machine tool, 190: completed workpiece placing table, 210, 215: workpiece, 210$p$: assembled body, 210$q$: completed article 215$p$: material, 215$q$: intermediate machined material, 225: inner flange portion, 225$a$: inner circumferential surface, 310: workpiece conveyance device, 320: robot arm

The invention claimed is:

1. A workpiece holding device comprising:

a plurality of first claw portions disposed to hold a workpiece in a center of the plurality of first claw portions, and disposed to be spaced apart from each other in a predetermined plane, the plurality of first claw portions disposed to move linearly in a direction parallel to the predetermined plane;

a second claw portion and a third claw portion disposed to hold the workpiece therebetween, and to face each other in a direction orthogonal to the predetermined plane; and a motion conversion mechanism portion that converts a linear motion associated with movement of the first claw portion into a linear motion in the direction orthogonal to the predetermined plane, transmits the linear motion to the second claw portion, and causes the second claw portion to linearly move in the direction orthogonal to the predetermined plane, each one of the plurality of first claw portions having a first grasping surface, the second claw portion having a second grasping surface, the third claw portion having a third grasping surface, the first grasping surface being different in shape from the second and third grasping surfaces.

2. The workpiece holding device according to claim 1, wherein the second claw portion and the third claw portion are provided in positions deviated from the plurality of first claw portions in the direction orthogonal to the predetermined plane.

3. The workpiece holding device according to claim 1, wherein the second claw portion and the third claw portion are provided in positions surrounded by the plurality of first claw portions when viewed in the direction orthogonal to the predetermined plane.

4. A workpiece holding device comprising:

a plurality of first claw portions disposed to hold a workpiece in a center of the plurality of first claw portions, and disposed to be spaced apart from each other in a predetermined plane, the plurality of first claw portions disposed to move linearly in a direction parallel to the predetermined plane;

a second claw portion and a third claw portion disposed to the workpiece therebetween, and to face each other in a direction orthogonal to the predetermined plane; and a motion conversion mechanism portion that converts a linear motion associated with movement of the first claw portion into a linear motion in the direction orthogonal to the predetermined plane, transmits the linear motion to the second claw portion, and causes the second claw portion to linearly move in the direction orthogonal to the predetermined plane, the third claw portion being integrated with the first claw portion.

5. The workpiece holding device according to claim 4, wherein the second claw portion and the third claw portion are provided in positions deviated from the plurality of first claw portions in the direction orthogonal to the predetermined plane.

6. The workpiece holding device according to claim 4, wherein the second claw portion and the third claw portion are provided in positions surrounded by the plurality of first claw portions when viewed in the direction orthogonal to the predetermined plane.

7. A workpiece holding device comprising:

a plurality of first claw portions disposed to hold a workpiece in a center of the plurality of first claw portions, and disposed to be spaced apart from each other in a predetermined plane, the plurality of first claw portions disposed to move linearly in a direction parallel to the predetermined plane;

a second claw portion and a third claw portion disposed to hold the workpiece therebetween, and to face each other in a direction orthogonal to the predetermined plane; and a motion conversion mechanism portion that converts a linear motion associated with movement of the first claw portion into a linear motion in the direction orthogonal to the predetermined plane, transmits the linear motion to the second claw portion, and causes the second claw portion to linearly move in the direction orthogonal to the predetermined plane, wherein the motion conversion mechanism portion includes:

a movement member that has a first inclined surface extending in a diagonal direction relative to the predetermined plane, that is linearly movable in the direction parallel to the predetermined plane together with the first claw portion, and that is supported to be linearly movable in the direction orthogonal to the predetermined plane; and a fixed member having a second inclined surface that is in surface contact with the first inclined surface, and the second claw portion is provided in the movement member at a position away from the first inclined surface in the direction orthogonal to the predetermined plane.

8. The workpiece holding device according to claim 7, wherein the plurality of first claw portions are disposed to be spaced apart from each other in a circumferential direction around a predetermined axis orthogonal to the predetermined plane and are linearly movable in a radial direction relative to the predetermined axis, and the workpiece holding device comprises a unit member in which the first claw portion, the third claw portion, and a supporting portion that supports the movement member to allow the movement member to linearly move in the direction orthogonal to the predetermined plane are integrally provided.

9. The workpiece holding device according to claim 7, wherein the movement member further has a third inclined surface that faces an opposite direction to the first inclined surface, and the fixed member further has a fourth inclined surface that faces an opposite direction to the second inclined surface and that is in surface contact with the third inclined surface.

10. A workpiece conveyance device comprising the workpiece holding device according to claim 1 to convey a workpiece held by the workpiece holding device.

11. A workpiece conveyance device comprising the workpiece holding device according to claim 4 to convey a workpiece held by the workpiece holding device.

12. A workpiece conveyance device comprising the workpiece holding device according to claim 7 to convey a workpiece held by the workpiece holding device.

\* \* \* \* \*